Nov. 18, 1924.

J. M. DAPRON 1,515,842

AIR BRAKE AND SAFETY CAR CONTROL APPARATUS

Filed Feb. 21, 1924  2 Sheets-Sheet 1

INVENTOR
JOSEPH M. DAPRON,
by James L. Hopkins, Attorney.

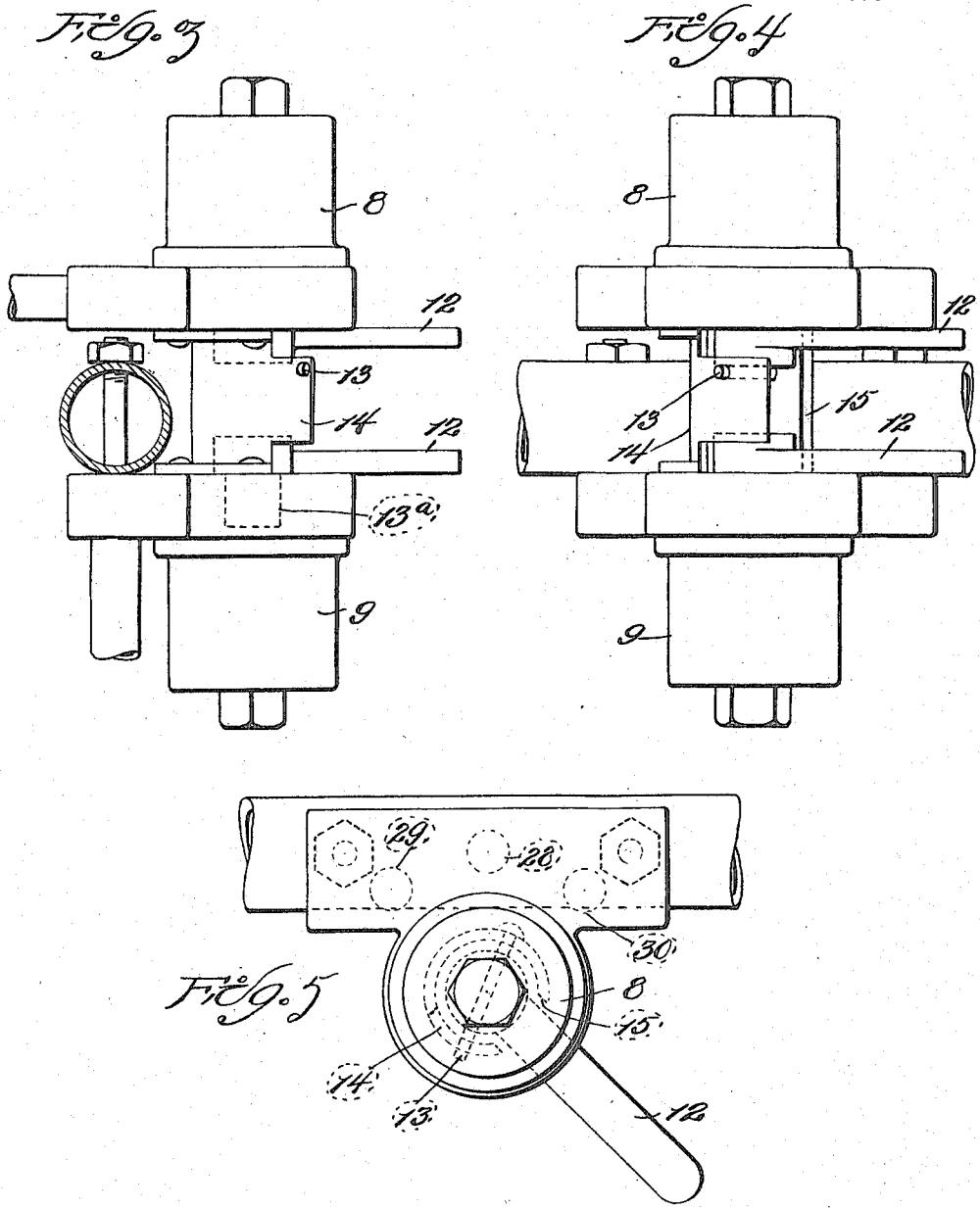

Patented Nov. 18, 1924.

1,515,842

UNITED STATES PATENT OFFICE.

JOSEPH M. DAPRON, OF ST. LOUIS, MISSOURI.

AIR-BRAKE AND SAFETY CAR-CONTROL APPARATUS.

Application filed February 21, 1924. Serial No. 694,243.

*To all whom it may concern:*

Be it known that I, JOSEPH M. DAPRON, a citizen of the United States of America, residing at the city of St. Louis, in the State of Missouri, have invented certain new and useful Improvements in Air-Brake and Safety Car-Control Apparatus, of which the following is a specification, reference being had therein to the accompanying drawing.

My invention relates to air brake and safety car control mechanism and has for its object to provide passenger cars with pneumatic door operating means, operable from within or without the car, in combination with air brake mechanism so arranged that the opening of the door applies the brakes and the brakes can only be released by closing the door; my invention having particular relation to the equipment of the ordinary two-man operated traction car so that the services of the conductor may be dispensed with and the car operated by the motorman as a one-man car, with the assistance of a street fare-conductor outside the car.

Other instances and objects of my invention will appear from the appended description.

Drawings.

Fig. 3 is a side elevation of the double door-controlled valve employed in my invention.

Fig. 4 is a front view of the same.

Fig. 5 is a top plan view of the control valve.

Description.

Figure 1:
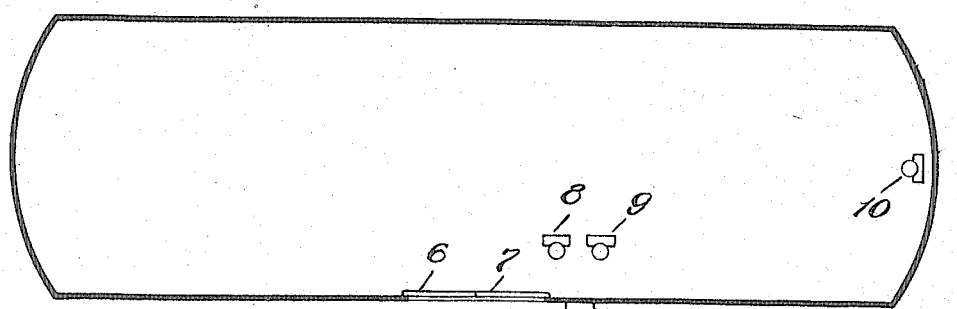
Fig. 1 is a diagrammatic plan view of car equipped with the mechanism of my invention.
Figure 2:
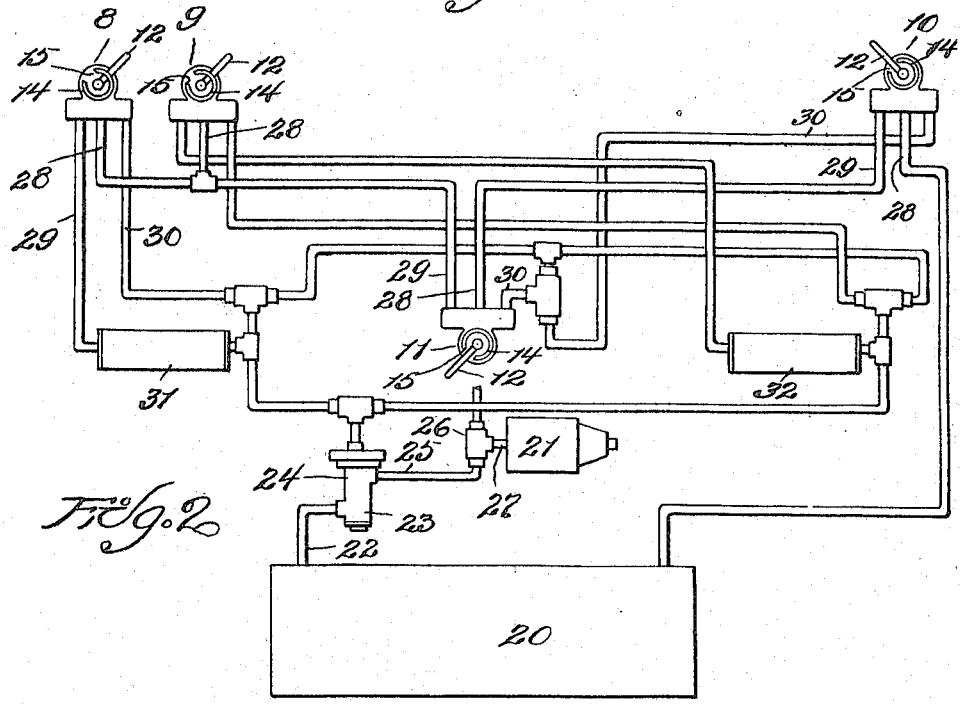
Fig. 2 is a diagrammatic view of the apparatus employed therein.

In Fig. 1 two sliding doors 6 and 7 are indicated, the movement of the door 6 being controlled by the valve 8 and the movement of the door 7 being controlled by the valve 9, said valves being at the position usually occupied by the conductor. The motorman's control valve is indicated as 10 and the street fare-conductor's valve as 11. Each of these valves is connected by suitable piping as shown in Fig. 2 to the main reservoir 20.

In practice, the conductor's valves 8 and 9 are mounted one above the other as shown in Fig. 3, the valve 8 being inverted and the lever 12 of said valve being secured against dropping out when said valve 8 is in door-closed position, as in Fig. 5, by the pin 13. The levers 12 of said valves 8 and 9 may be operated together to open or close the door, being so closely mounted together as to be held in the hand of the conductor, but sufficiently separated to permit their independent operation. Each of said levers 12 has at its inner end a jaw $13^a$ engaging with the valve stem to be operated, as shown in detail in my co-pending application for United States Letters Patent No. 641,790 filed May 26, 1923. The levers 12 are held in such engagement by the collar 14, except when such levers 12 are moved to the door-closed position illustrated in Fig. 5, when the slot 15 permits their disengagement and removal from the valves whereon they are detachably seated.

The brake cylinder 21 is connected with the main reservoir 20 through the pipe 22, relay valve 23 having the intermediate chamber 24 from which chamber 24 the pipe 25 extends to the double check valve 26, to which the brake cylinder 21 is connected by the pipe 27. Each of the valves 8, 9, 10, and 11 is provided with an air-inlet-pipe 28, a door-closing pipe 29, and a door-opening pipe 30, the connection of all of said pipes 28, 29 and 30 with their respective valves and with the door engines 31 and 32 being such that the pressure from the main reservoir 20 is controlled by said valves to effect the opening and closing of the doors 6 and 7, the conductor-operated valves 8 and 9 acting independently upon the respective doors 6 and 7. When the hand levers 12 are removed from the valves 8 and 9, leaving said valves 8 and 9 in door-closed position, the valve 11 outside the car and the valve 10 inside the car operate to open and close said doors 6 and 7 simultaneously.

Mode of operation.

By means of the location of the several valves 8, 9, 10, and 11, and their connection with the piping system illustrated and described, it is possible to operate the car, the levers 12 being removed from the valves 8 and 9, without a conductor, in which case the motorman controlled valve 10 will be equipped with the lever 12 and the valve 11 outside the car will be used at the point of receiving passengers by the street fare-conductor, who will use one of the levers 12 for that purpose, removing and retaining said lever 12 when he has admitted the load of passengers and collected their fares.

The piping connections between the main reservoir 20 and the door engines 31—32 is such that both said engines 31—32 are actuated simultaneously when the motorman's control valve 10 or the street fare-taker's control valve 11 are used, to open or close the doors 6 and 7. This operation could be effected by a single engine if it were not for the desirability of having independent control of said doors 6 and 7 by the conductor (one of said doors being used as an entrance and the other as an exit). For this reason the dual valves (8 and 9) are provided at the conductor's station, inside the car.

I claim:—

1. In a mechanism of the class described, a triple control for an air-actuated door engine mounted on car comprising two inner control valve mechanisms stationed at different points within the car, and an outer control valve.

2. In a mechanism of the class described, a triple control for an air-actuated door engine mounted on car comprising two inner control valve mechanisms stationed at different points within the car, and an outer control valve; said control valves being each equipped with a control lever removable therefrom only when valve is in door-closed condition.

3. In a mechanism of the class described, a control for two car doors comprising a pair of conductor's valves each of which controls one of said doors; a single motorman's valve controlling both of said doors; and a street-fare-taker's valve controlling both of said doors.

4. In a mechanism of the class described, a control for two car doors comprising a pair of conductor's valves each of which controls one of said doors, and so mounted as to be capable of joint operation; a single motorman's valve controlling both of said doors; and a street-fare-taker's valve controlling both of said doors.

In testimony whereof I have hereunto affixed my signature.

JOSEPH M. DAPRON.